Figure 1:
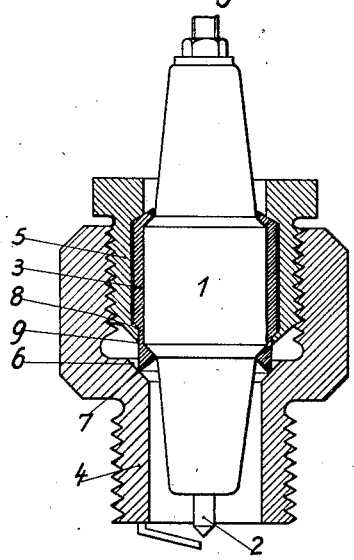

Aug. 18, 1925.

H. KÖRBER

SPARKING PLUG

Filed Oct. 29, 1921

1,550,172

INVENTOR:—
Hermann Körber
by R. F. ———
his Attorney

Patented Aug. 18, 1925.

1,550,172

UNITED STATES PATENT OFFICE.

HERMANN KÖRBER, OF STUTTGART, GERMANY, ASSIGNOR TO ROBERT BOSCH AKTIENGESELLSCHAFT, OF STUTTGART, GERMANY.

SPARKING PLUG.

Application filed October 29, 1921. Serial No. 511,330.

*To all whom it may concern:*

Be it known that I, HERMANN KÖRBER, a citizen of Germany, residing at Stuttgart, Germany, have invented certain new and useful Improvements in Sparking Plugs, of which the following is a specification.

In the manufacture of sparking plugs, as at present carried through, special value is placed upon the plugs permitting of being easily cleaned. This is necessitated by the use of low-grade fuel by which the electrodes of the plugs are sooted and soiled, so that the passage of the sparks is disturbed, as is also the ignition of the gas mixture.

There exist already sparking plugs, in which for the purpose in question, the insulating body is detachably inserted into the plug body which is screwed into the cylinder wall, thereby enabling the plug to be disassembled for inspection, repair, or cleaning in case of failure to operate.

To secure the insulating body in position in the plug it has heretofore been fitted into a metallic sleeve engaged by the cap nut by which the insulating body is secured in the plug body. But all known arrangements of the kind in question are possessed of the drawback that the plug, especially after having been taken to pieces and reassembled, is no more tight enough. In other words, its interior component parts no longer form a perfect seal against the combustion gases. This is due partly to the packing-members not being sufficiently substantial and being damaged when the plug is taken to pieces, and partly to said members being subjected to an undue stress when the plug parts are re-assembled and the fastening nut is pressed upon them whilst being screwed home. On the other hand, those plugs which allow of being taken to pieces, but have no special packing members, suffer from the beginning from an insufficient tightness.

The invention obviates the drawbacks mentioned by a special construction of the contacting parts of the metal sleeve into which the insulating body is fitted and the plug body. Said parts are so shaped that the tightening of the plug body and the metallic sleeve relatively to one another is effected solely by a rim or an edge of one of these parts abutting upon a surface of the other part, as is more fully described hereinafter. As, whilst assembling or disconnecting the parts, no sliding friction arises, they remain undamaged even if they are frequently taken apart. In order to reduce the number of the plug parts, and particularly the number of plug parts required to be separately handled or manipulated in assembling or disassembling the plug, my invention also contemplates connecting the cap nut with the insulating body in such manner that these two parts cannot spontaneously separate when the plug is taken to pieces, but remain connected with each other at all times without either impairing the function of the other part.

Figure 2:
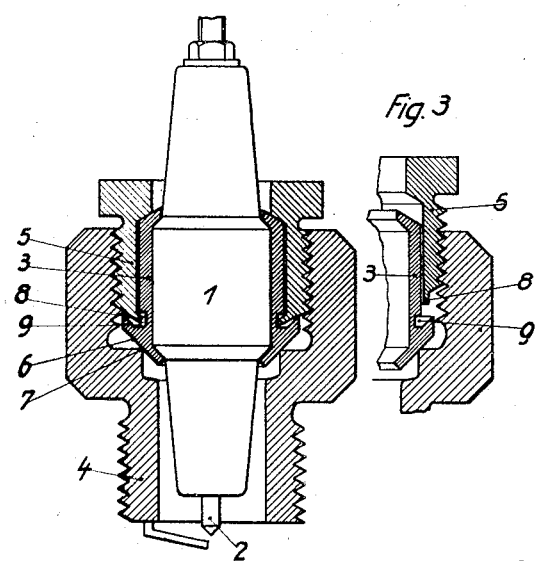
Figure 3:
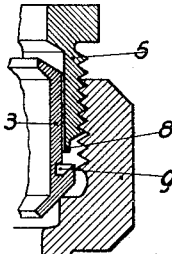

In order to make my invention more clear, I refer to the accompanying drawing, in which similar numbers of reference denote similar parts throughout the several views, and in which Fig. 1 is a longitudinal section through a sparking plug constructed according to this invention, the centrally located insulating body (1) being, however, shown in sideview;

Fig. 2 is an illustration similar to Fig. 1, showing a slightly modified form of construction; and Fig. 3 shows some portions of Fig. 2, one of them (the cap nut 5) being shown in another position. The sparking plug has the known insulating body 1 to which is attached the middle electrode 2. The insulating body is provided with a metallic fitting 3 which may closely embrace (as in the examples shown in Figs. 1 and 2) a reinforced or enlarged middle portion that forms a kind of collar of said body 1. The plug body 4 has at its lower end a screw-thread with which it may be screwed into the cylinder cover. A cap nut 5 serves to fasten the insulating body 1 in the plug body.

In the form of construction shown in Fig. 1 the plug body 4 has an inner hopper-shaped or coned surface 6, and the sleeve 3 has at its lower end an annular edge 7 which bears upon said surface 6. When pressing the edge 7 against the surface 6 by means of the nut 5 a perfect tightness or seal is obtained which is not diminished even by repeatedly disconnecting and re-composing the parts concerned because the edge 7 does not slide or grind upon the surface 6.

In the other form of construction (Figs. 2 and 3) the fitting 3 has a conical surface 6 and the plug body has a rim or an edge 7 against which bears said surface 6. It is obviously the reversal of Fig. 1 and the manner of operation and the effect is the same as described with respect to Fig. 1.

In order to reduce as much as possible the number of the parts that must be disassembled and assembled for the purpose in view, and thus simplify the manipulation, the nut 5 may be connected with the fitting 3, or with the insulating body 1 respectively, in such a manner that these parts cannot spontaneously separate, and yet will permit their relative moveability required in assembling and disassembling the plug. The nut 5 has, for this purpose, an annular lower end 8 and the sleeve 3 has a reduced portion 9, Fig. 1, which may form a groove, as in Fig. 2. In the form of construction shown in Fig. 1 the ring 8 is flanged inwards towards the sleeve portion 9, in such a measure that the nut may still rotate around the sleeve; in the form of construction shown in Fig. 2 the flanging is automatically effected by forcing the ring 8 against and into the groove 9, the lower bounding surface of the groove being a conical surface which directs the ring into the groove proper. It is obvious that also in this case the nut and the sleeve remain rotatable relatively to one another.

Having thus particularly described the nature of my invention, what I claim as new and desire to secure by Letters Patent of the United States is:

1. In a spark plug, the combination with a plug body having a central bore and an insulator adapted to extend therein, of insulator positioning means comprising a sleeve closely engaging about said insulator intermediate its ends and having a depending lower rim presenting an annular bearing surface, an annular shoulder on the interior walls of said plug body presenting an annular inclined bearing surface adapted to coact with said first mentioned bearing surface to centrally position said insulator, and a cap nut for said plug body swivel mounted on said sleeve.

2. A spark plug comprising, in combination, an insulator forming a central electrode holder, a metallic sleeve closely encompassing an intermediate portion of said insulator and having annular shoulders and an annular projection terminating in a bearing surface, a cap nut loosely engaged about the sides and shoulders of said sleeve to form a rotatable coupling union permitting relative lateral play of said insulator and sleeve therein, and a hollow plug body adapted to receive said insulator and sleeve and having an annular bearing surface coacting with the bearing surface on said sleeve to centrally position said insulator, said plug body and cap nut being cooperatively threaded, whereby upon turning said cap nut in one direction on said plug body said insulator is forced into position rigidly and centrally mounted in said plug body and whereby upon turning of said cap nut in the opposite direction said insulator is removed with said cap nut as a coupling union thereon.

3. A spark plug comprising, in combination, an insulator forming a central electrode holder, a metallic sleeve closely encompassing an intermediate portion of said insulator, a hollow plug body adapted to receive said insulator and sleeve, a screw threaded cap nut for said plug body, said cap nut loosely engaging about the sides and end portions of said sleeve to form a rotatable coupling union thereon permitting a limited lateral and axial movement of said sleeve and insulator therein, and insulator positioning and sealing means comprising an annular rim part projecting from an end portion of said sleeve and a cooperating annular shoulder part on the interior walls of said plug body, one of said parts presenting an annular edged bearing surface and the other a coacting annular inclined-plane bearing surface, whereby upon drawing said cap nut on said plug body said insulator is forced into central and sealed position in said plug body and whereby upon removal of said insulator from said plug body said cap nut remains on said insulator as a coupling union thereon.

In testimony whereof I have affixed my signature.

HERMANN KÖRBER.